US012131880B2

(12) United States Patent
Shi et al.

(10) Patent No.: US 12,131,880 B2
(45) Date of Patent: Oct. 29, 2024

(54) FUSE AND CIRCUIT SYSTEM

(71) Applicant: XI' AN SINOFUSE ELECTRIC CO., LTD., Shaanxi (CN)

(72) Inventors: Xiaoguang Shi, Shaanxi (CN); Xibin Ge, Shaanxi (CN); Wei Wang, Shaanxi (CN); Hui Cao, Shaanxi (CN); Ning Wang, Shaanxi (CN)

(73) Assignee: XI' AN SINOFUSE ELECTRIC CO., LTD., Shaanxi (CN)

( * ) Notice: Subject to any disclaimer, the term of this patent is extended or adjusted under 35 U.S.C. 154(b) by 207 days.

(21) Appl. No.: 17/799,745

(22) PCT Filed: Apr. 7, 2021

(86) PCT No.: PCT/CN2021/085832
§ 371 (c)(1),
(2) Date: Aug. 15, 2022

(87) PCT Pub. No.: WO2021/204165
PCT Pub. Date: Oct. 14, 2021

(65) Prior Publication Data

US 2023/0352252 A1 Nov. 2, 2023

(30) Foreign Application Priority Data

Apr. 7, 2020 (CN) ......................... 202010263397.9
Mar. 24, 2021 (CN) ......................... 202110316698.8

(51) Int. Cl.
*H01H 85/38* (2006.01)
*H01H 9/34* (2006.01)
(Continued)

(52) U.S. Cl.
CPC .......... *H01H 9/34* (2013.01); *H01H 85/0039* (2013.01); *H01H 85/38* (2013.01);
(Continued)

(58) Field of Classification Search
CPC ...... H01H 9/34; H01H 85/0039; H01H 85/38; H01H 3/22; H01H 3/24; H01H 85/12;
(Continued)

(56) References Cited

U.S. PATENT DOCUMENTS 4,307,369 A 12/1981 Jackson, Jr.
6,556,119 B1 * 4/2003 Lell ...................... H01H 37/323
337/182

(Continued)

FOREIGN PATENT DOCUMENTS

CN 101950715 A 1/2011
CN 102290301 A 12/2011

(Continued)

OTHER PUBLICATIONS

Translation of JP5817685B2.*

(Continued)

*Primary Examiner* — Jacob R Crum
(74) *Attorney, Agent, or Firm* — IP & T GROUP LLP

(57) ABSTRACT

Provided are a fuse and a circuit system. The fuse includes: a housing, a closed chamber being provided in the housing and being filled with an arc extinguishing filler, and a first conductive terminal and a second conductive terminal which are used as a current input end and a current output end being respectively connected to the housing; a melt which is connected in series between the first conductive terminal and the second conductive terminal, at least part of the melt being disposed through the closed chamber; and an impact apparatus, which is arranged in the housing, is positioned outside the closed chamber, and is configured to act, when receiving an excitation signal, on the melt to generate an impact force to make the melt break in the closed chamber.

19 Claims, 5 Drawing Sheets

(51) Int. Cl.
*H01H 85/00* (2006.01)
*H01H 3/22* (2006.01)
*H01H 3/24* (2006.01)
*H01H 85/36* (2006.01)

(52) U.S. Cl.
CPC ................. *H01H 3/22* (2013.01); *H01H 3/24* (2013.01); *H01H 85/36* (2013.01)

(58) Field of Classification Search
CPC ........... H01H 39/006; H01H 2039/008; H01H 85/18; H01H 39/00; H01H 85/36
See application file for complete search history.

(56) References Cited

U.S. PATENT DOCUMENTS

| | | | | |
|---|---|---|---|---|
| 2013/0263715 | A1* | 10/2013 | Ukon | H01H 39/006 83/639.1 |
| 2014/0061161 | A1* | 3/2014 | Nakamura | H01H 33/06 218/46 |
| 2019/0371561 | A1 | 12/2019 | Ehrhardt et al. | |
| 2020/0279711 | A1* | 9/2020 | Mathieu | H01H 85/0039 |

FOREIGN PATENT DOCUMENTS

| | | | |
|---|---|---|---|
| CN | 205140788 | U | 4/2016 |
| CN | 207303031 | U | 5/2018 |
| CN | 207690743 | U | 8/2018 |
| CN | 109148237 | A | 1/2019 |
| CN | 110854000 | A | 2/2020 |
| CN | 111341627 | A | 6/2020 |
| DE | 10-2015-114279 | A | 10/2015 |
| DE | 102015114279 | A1 | 10/2015 |
| JP | 2014-049272 | A | 3/2014 |
| JP | 5817685 | B2 | 11/2015 |
| JP | 2019-029152 | A | 2/2019 |
| WO | 2016/062305 | A1 | 4/2016 |
| WO | 2017/032362 | A1 | 3/2017 |

OTHER PUBLICATIONS

The First Office Action for Chinese Patent Application No. 202110316698.8 issued by the Chinese Patent Office.
The First Search for Chinese Patent Application No. 202110316698.8 issued by the Chinese Patent Office.
Supplementary Search for Chinese Patent Application No. 202110316698.8 issued by the Chinese Patent Office.
International Search Report for International Application No. PCT/CN2021/085832 issued by the Chinese Patent Office on Jun. 28, 2021.
Written Opinion for International Application No. PCT/CN2021/085832 issued by the Chinese Patent Office on Jun. 28, 2021.
Office Action for Japanese Patent Application No. 2022-542072 issued by the Japanese Patent Office on Jul. 25, 2023.
Decision to Grant a Patent for Japanese Patent Application No. 2022-542072 issued by the Japanese Patent Office on Nov. 7, 2023.
Office Action for Korean Patent Application No. 10-2022-7025366 issued by the Korean Patent Office on Mar. 26, 2024.
Office Action for European Patent Application No. 21784797.9 issued by the European Patent Office on May 26, 2023.
Supplementary European Search Report for European Patent Application No. 21784797.9 issued by the European Patent Office on May 26, 2023.

* cited by examiner

FUSE AND CIRCUIT SYSTEM

CROSS-REFERENCE TO RELATED APPLICATION

The present disclosure claims the priority to the Chinese patent application with the filing No. 202010263397.9, filed on Apr. 7, 2020 with the Chinese Patent Office, and entitled "Excitation Fuse Integrated with Mechanical-Force-Broken Arc-Extinguishing Melt", and the Chinese patent application with the filing No. 202110316698.8, filed on Mar. 24, 2021 with the Chinese Patent Office, and entitled "Fuse and Circuit System", the contents of which are incorporated herein by reference in entirety.

TECHNICAL FIELD

The present disclosure relates to the technical field of circuit protection, and in particular to a fuse and a circuit system.

BACKGROUND ART

The fuse is a common overcurrent protection product of a circuit. Generally, a fuse wire of a fuse, when an excessive current flows therethrough, is broken due to heat generated by the current. The load matching relation of such thermal fuse is hard to determine. If a fuse with a low current specification is selected, the situation of short-term current overshoot cannot be satisfied, and if a fuse with a high current specification is selected, the requirement of quick protection cannot be satisfied.

Based on the above situations, a fuse broken by mechanical impact is provided in the prior art, including: a housing, enclosed to form a mounting chamber; a fuse link, provided in the mounting chamber; and a cutting component, configured to cut off the fuse link when being subjected to an external force. The fuse broken by mechanical impact cuts off the fuse link when being subjected to an external force. However, the prior art has the problems that the fuse link is likely to generate a lot of arcs when being impacted to break, and the safety performance is poor.

SUMMARY

An objective of the embodiments of the present disclosure is to provide a fuse and a circuit system, so as to quickly cut off the circuit without generating arc leakage, improve an upper limit of the protection circuit, and extend a lower limit of the protection current to zero current.

The present disclosure provides a fuse, including: a housing, a closed chamber being provided in the housing, the closed chamber being filled with an arc extinguishing filler, and a first conductive terminal and a second conductive terminal which are respectively used as a current input end and a current output end being connected to the housing; a fusant (melt), connected in series between the first conductive terminal and the second conductive terminal, and at least partially provided in the closed chamber in a penetrating manner; and an impact apparatus, provided in the housing and located outside the closed chamber, and configured to act, when receiving an excitation signal, on the fusant to generate an impact force so as to make the fusant broken in the closed chamber.

Optionally, a plurality of closed chambers are provided, a corresponding fusant is provided in each of the closed chambers in a penetrating manner, and the plurality of fusants provided in the plurality of closed chambers in a penetrating manner are connected in series or in parallel.

Optionally, a plurality of fusants connected in parallel are provided in the closed chamber in a penetrating manner, and the plurality of fusants connected in parallel are provided as a fusant to be broken first and a fusant to be broken later.

Optionally, the fuse further includes a fusant punch, the fusant punch is provided on an outer wall of the closed chamber in a dynamic sealing manner, with one end being linked with the impact apparatus, and the other end being opposite to the fusant to be broken first, and is configured to move and break the fusant to be broken first by impacting when the impact apparatus acts.

Optionally, the fusant to be broken later is provided with a zigzag segment, configured to be broken after extending to a predetermined length.

Optionally, the zigzag segment is in an S-shaped wave structure or a spiral structure.

Optionally, a weak portion is provided at a position where the fusant is located within the closed chamber, so that the fusant is broken at the weak portion when being impacted.

Optionally, a structure of the weak portion is a through hole or a breaking groove (a groove for breaking).

Optionally, the impact apparatus includes: a drive member and an impact member, the drive member is configured to drive the impact member to act when receiving an excitation signal, the excitation signal being an excitation signal sent when a fault current is detected or an excitation signal sent in response to a user operation; and the impact member is configured to generate a pulling force on the fusant when acting so as to make the fusant broken under effect of a pulling force.

Optionally, the number of closed chambers is two, the fusant includes a first fusant and a second fusant provided in the two closed chambers in a penetrating manner; and the impact apparatus is located between the two closed chambers.

Optionally, the first conductive terminal and the second conductive terminal are respectively inserted into the housing from two sides of the housing, the fuse further includes the connection conductive terminal provided in the housing, the first fusant is connected between the first conductive terminal and the connection conductive terminal, and the second fusant is connected between the second conductive terminal and the connection conductive terminal; and the impact apparatus is opposite to the connection conductive terminal, and is configured to impact the connection conductive terminal to move so as to make the fusant broken.

Optionally, the fuse further includes a guide member, configured to guide the impact apparatus and the connection conductive terminal.

Optionally, the second conductive terminal includes a to-be-broken portion, and the to-be-broken portion is spaced apart from and opposite to the first conductive terminal; the first fusant and the second fusant each have one end connected to the first conductive terminal, and the other end connected to the to-be-broken portion; and the impact apparatus is opposite to the to-be-broken portion, and is configured to impact the to-be-broken portion to move so as to make the fusant broken.

Optionally, the closed chamber is provided with an opening, a sealing plug is provided in the opening, and the fusant passes through the sealing plug to enter the closed chamber or exit the closed chamber.

Optionally, the arc extinguishing filler is a solid arc extinguishing filler such as silicon dioxide.

The present disclosure further provides a circuit system, including the fuse according to any one of the above.

BRIEF DESCRIPTION OF DRAWINGS

In order to more clearly illustrate technical solutions of embodiments of the present disclosure, accompanying drawings which need to be used in the embodiments of the present disclosure will be introduced briefly below, and it should be understood that the accompanying drawings below merely show some embodiments of the present disclosure, therefore, they should not be considered as limitation on the scope, and those ordinarily skilled in the art still could obtain other relevant accompanying drawings according to these accompanying drawings, without using any creative efforts.

DETAILED DESCRIPTION OF EMBODIMENTS

Figure 1:
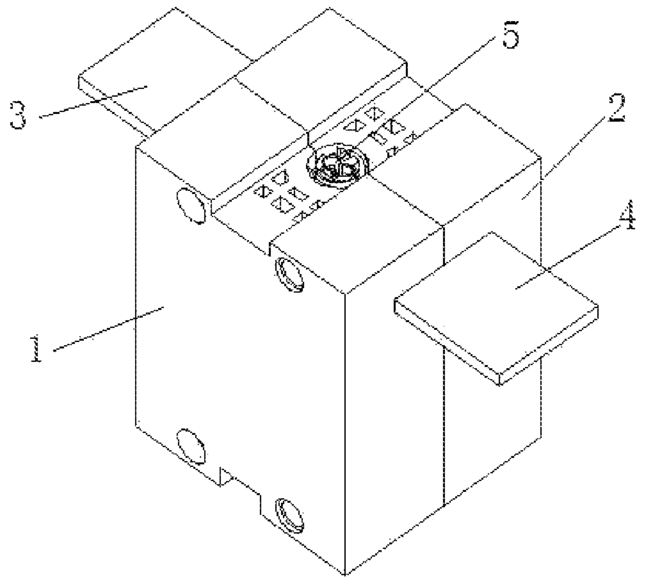
FIG. 1 is an overall structural schematic view of a fuse provided in an embodiment of the present disclosure.

The technical solutions in the embodiments of the present disclosure will be described below in conjunction with accompanying drawings in the embodiments of the present disclosure.

It should be noted that similar reference signs represent similar items in the following accompanying drawings, therefore, once a certain item is defined in one accompanying drawing, it is not needed to be defined or explained in subsequent accompanying drawings. Meanwhile, in the description of the present disclosure, terms such as "first" and "second" are merely for distinctive description, but should not be construed as indicating or implying importance in relativity.

An embodiment of the present disclosure provides a fuse, including: a housing, a closed chamber being provided in the housing and being filled with an arc extinguishing filler, and a first conductive terminal and a second conductive terminal which are respectively used as a current input end and a current output end being connected to the housing; a fusant, connected in series between the first conductive terminal and the second conductive terminal, and at least partially provided in the closed chamber in a penetrating manner; and an impact apparatus, provided in the housing and located outside the closed chamber, and configured to act, when receiving an excitation signal (also called as a trigger signal), on the fusant to generate an impact force so as to make the fusant broken in the closed chamber.

In normal use, the fusant is connected between the first conductive terminal and the second conductive terminal to conduct current. When the current is too large and too much heat is generated, the fusant is broken, which is a common thermal fusing process. Besides, the impact apparatus further can receive the excitation signal to act, and generate an impact force on the fusant to make the fusant broken, which is a mechanical impacting and breaking process. Moreover, the closed chamber filled with the arc extinguishing filler is provided in the housing, the fusant is broken in the arc extinguishing filler, and sparks, arcs and so on generated at broken part are quickly extinguished and will not leak, with high safety.

Thus, by providing the impact apparatus, the fuse provided in the embodiments makes the fusant broken under the impact action, may not be limited by a fusing current, and realizes quick cut-off under currents of different magnitudes and even zero current. The breaking position of the fusant is located in an arc extinguishing filler environment, then the generated sparks, arcs and so on are quickly extinguished and will not leak, with high safety. Besides, the impact apparatus generates an impact force outside the closed chamber, so that the fusant is broken in the closed chamber, the arc extinguishing filler and the impact apparatus both function without mutual interference, with high stability.

The above arc extinguishing filler may be a solid arc extinguishing filler such as silicon dioxide. The fusant may be a thermal fused conductor in various forms such as fuse wire or fuse link, as long as the fusant can be broken when being subjected to a force.

In an embodiment, the fusant is at least partially located in the closed chamber. That is, the fusant may be entirely located in the closed chamber; or partially located in the closed chamber, and partially located outside the closed chamber. The specific configuration manner of the fusant in the embodiments is not limited as long as it can be guaranteed that the fusant is broken in the closed chamber.

Optionally, a weak portion is provided at a position where the fusant is located within the closed chamber, so that the fusant is broken at the weak portion when being impacted. By means of such configuration, on one hand, the fusant can be conveniently broken under an impact force, and on the other hand, it can be ensured that the breaking position is located in the closed chamber, and the arc extinguishing filler serves the arc extinguishing effect.

An up-down direction shown in FIGS. 1-8 is taken as a length direction of the fusant, and a width direction of the fusant is perpendicular to the up-down direction, and is located in a horizontal plane. The above-mentioned weak portion can be obtained by providing a plurality of holes on the fusant at intervals along the width direction, or obtained by providing a breaking groove distributed along the width direction, and the length of the breaking groove is the same as the width of the fusant. The breaking groove can be in a V shape, a U shape or other shapes that facilitate breaking, as long as the thickness can be made thinner and the weak portion can be created. In practical products, the breaking groove can be formed by various processing methods, for example, spot welding, crimping, spring contact, riveting, and pre-charging fracture. On one hand, the fusant can be conveniently broken under an impact force, and on the other hand, it can be ensured that the breaking position is located in the closed chamber, and the arc extinguishing filler achieves the arc extinguishing effect.

Figure 2:
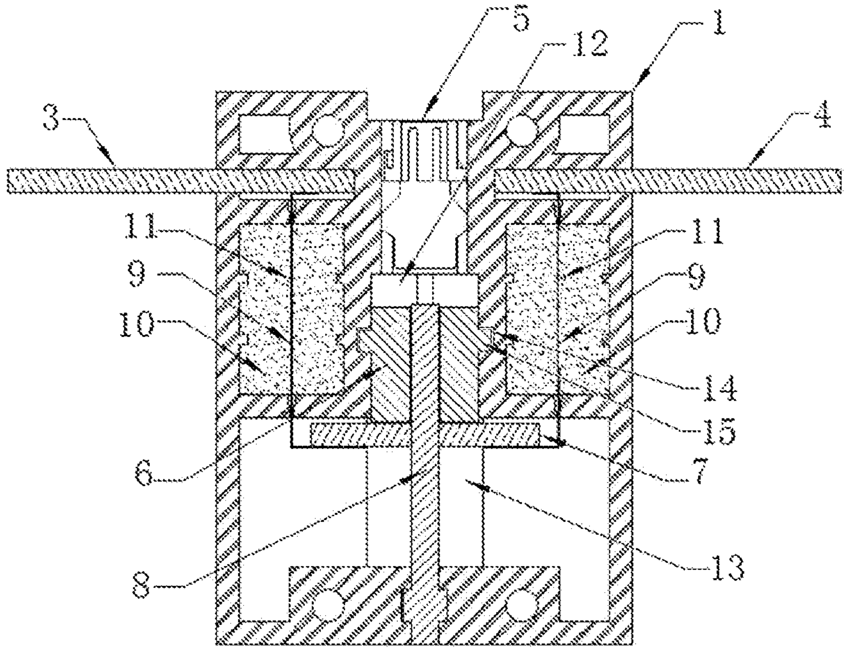
FIG. 2 is a front sectional view of the fuse in a normal operation state provided in an embodiment of the present disclosure.
Figure 3:
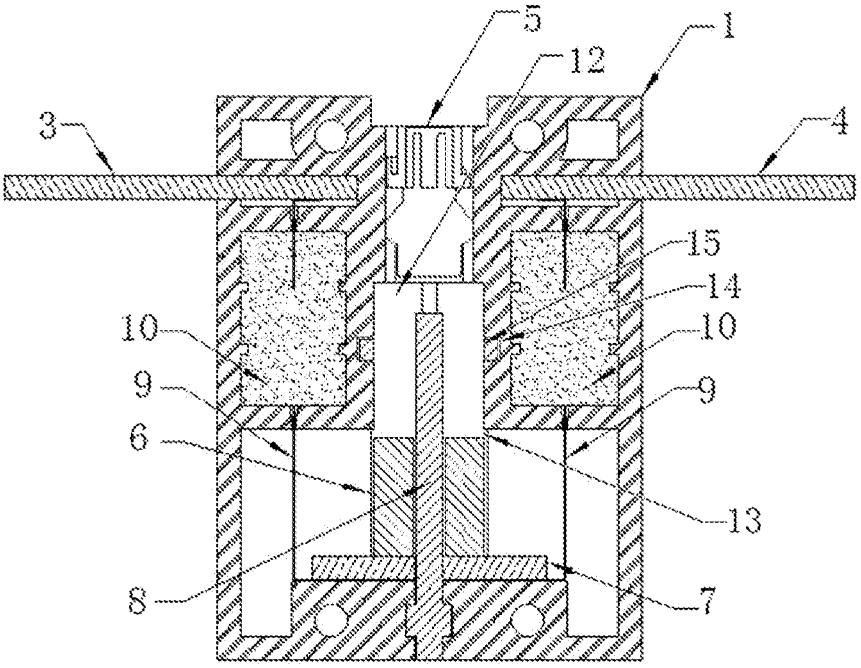
FIG. 3 is a front sectional view of the fuse, when being broken, provided in an embodiment of the present disclosure.
Figure 4:
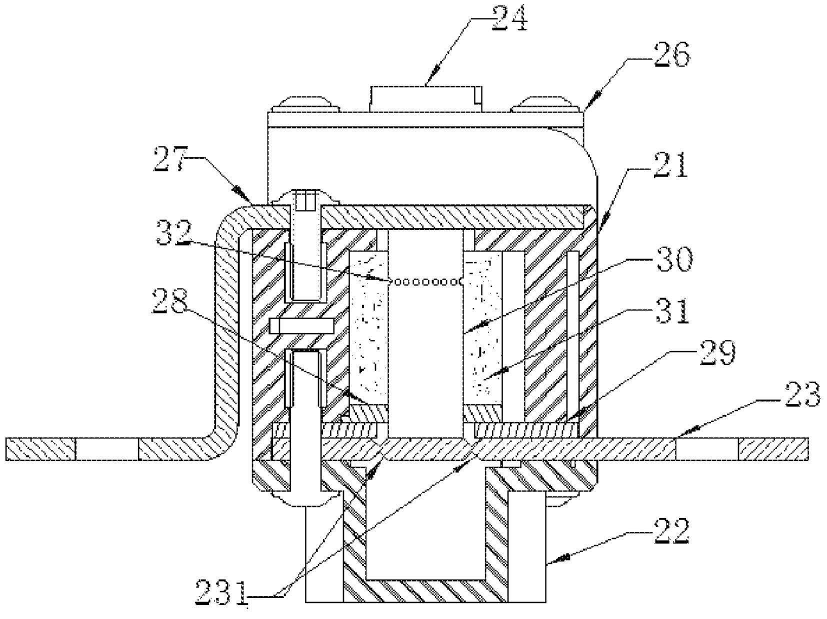
FIG. 4 is a front sectional view of an optional fuse, in a normal operation state, provided in an embodiment of the present disclosure.
Figure 5:
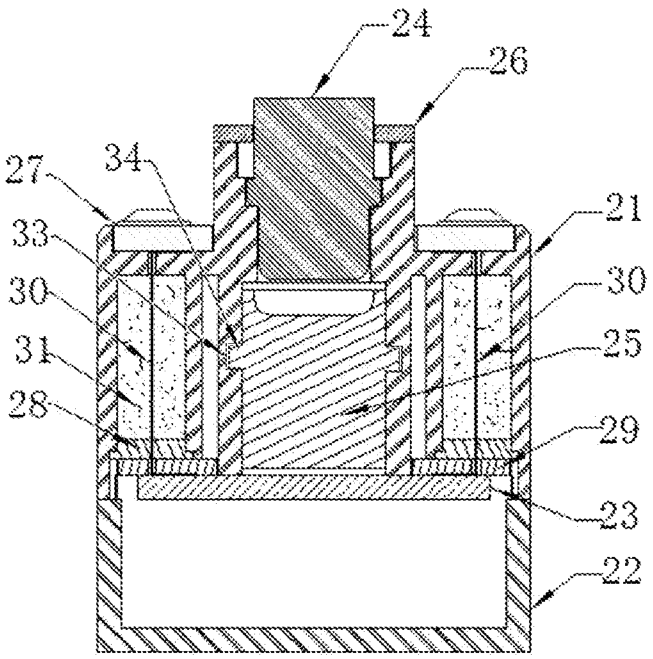
FIG. 5 is a side sectional view of an optional fuse, in a normal operation state, provided in an embodiment of the present disclosure.
Figure 6:
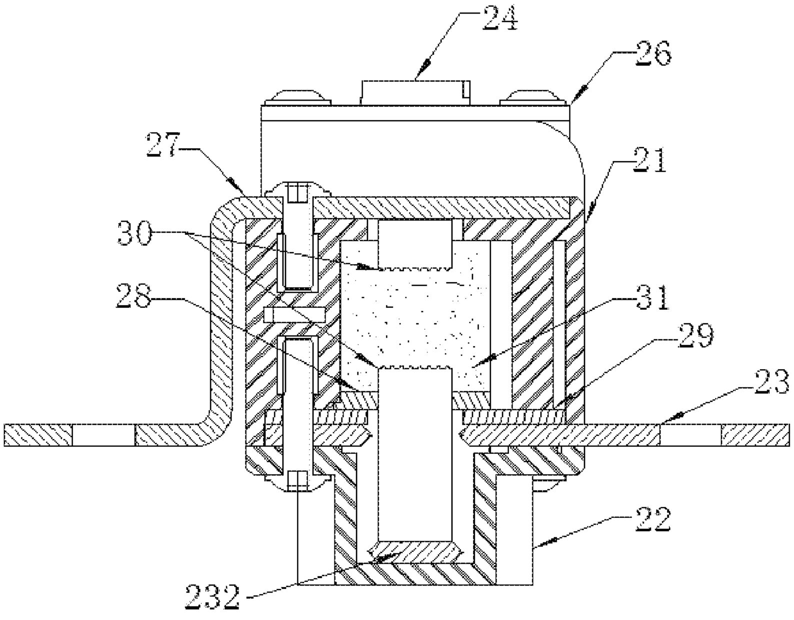
FIG. 6 is a front sectional view of an optional fuse, when being broken, provided in an embodiment of the present disclosure.
Figure 7:
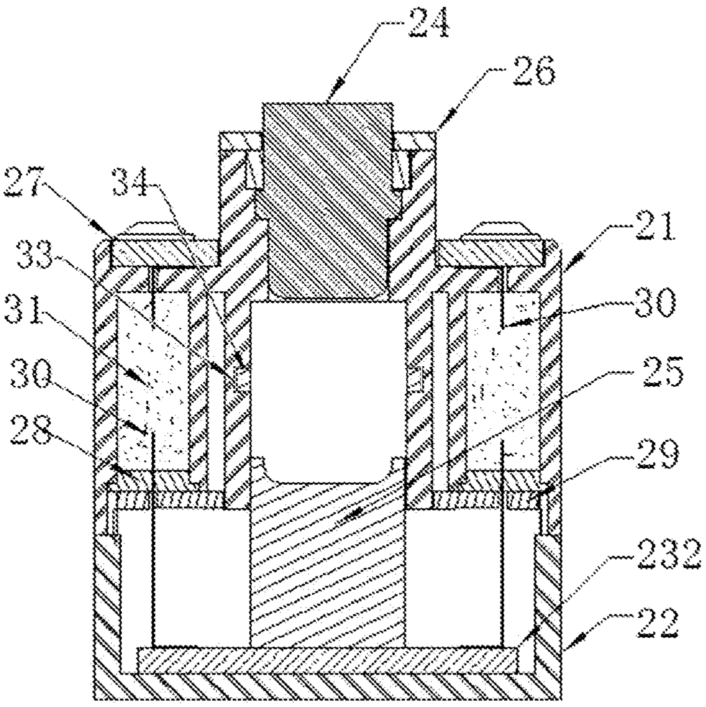
FIG. 7 is a side sectional view of an optional fuse, when being broken, provided in an embodiment of the present disclosure.

Optionally, a plurality of closed chambers are provided, a corresponding fusant is provided in each closed chamber in a penetrating manner, and the plurality of fusants provided in the plurality of closed chambers in a penetrating manner are connected in series or in parallel. In this way, the number of closed chambers and the connection manner of the fusants can be flexibly set according to actual situations, different numbers of closed chambers and fusants, and different connection manners between the fusants can be set according to actual requirements, with a wider application scope. For example, FIG. 1 to FIG. 3 show a case that two closed chambers are provided, and the fusants in the two closed chambers are connected in series. FIG. 4 to FIG. 7 show a case that two closed chambers are provided, and the fusants in the two closed chambers are connected in parallel.

Optionally, a plurality of fusants connected in parallel are provided in each closed chamber in a penetrating manner. In this way, the magnitude of a current and a force acting on each fusant can be reduced, so that a fuse in a normal operation state has a stable state, and can withstand a larger current.

The number of fusants connected in parallel in the closed chamber can be adaptively set according to actual requirements, and is not limited, for example, three, five or ten fusants can be connected in parallel in each closed chamber.

Optionally, two fusants connected in parallel may be provided in each closed chamber, and the two fusants are provided as a fusant to be broken first and a fusant to be broken later. The magnitude of a current and a force acting on each fusant can be reduced, so that the fuse in a normal operation state has a stable state. As the two fusants are successively broken, the fusant broken later can be more easily broken under dual function of thermal fusing effect of current increase and the impact apparatus, so that when operating normally, the fusants as a whole can withstand a larger current, and are successively broken when being broken, then it is easier to realize the breaking, reducing the power consumption, and improving the large current breaking capacity. For details, reference can be made to FIG. 8.

Optionally, the fuse further includes a fusant punch, the fusant punch is provided on an outer wall of the closed chamber in a dynamic sealing manner, with one end being linked with the impact apparatus, and the other end being opposite to the fusant to be broken first, and is configured to move and break the fusant to be broken first by impacting when the impact apparatus acts. With such configuration, the fusant to be broken first can be broken by impacting through the impacting effect of the fusant punch, and the mechanical impacting and breaking response is quicker.

In the above, a part of the fusant punch opposite to the fusant to be broken first may be in an arrow shape or other structures that facilitate application of force to cut off the fusant. The fusant punch can be opposite to the weak portion on the fusant to be broken first.

Optionally, the fusant to be broken later is provided with a zigzag segment, configured to be broken after extending to a predetermined length. With such configuration, the fusant to be broken later, when being impacted, will be first stretched to a predetermined length and then be broken, and there is certain buffering time between the fusant to be broken later and the fusant to be broken first, ensuring that the fusants connected in parallel in the closed chamber can be broken successively.

In the above, the zigzag segment may be in an S-shaped wave structure, a spiral structure, etc., as long as the zigzag segment can extend when being subjected to a force. In this way, the fusant to be broken later, when being impacted, will be first stretched to a predetermined length and then be broken, and there is certain buffering time between the fusant to be broken later and the fusant to be broken first, ensuring that the fusants connected in parallel in the closed chamber can be broken successively.

Optionally, a cross-sectional dimension of the fusant to be broken first can be larger than that of the fusant to be broken later, so that the fusant to be broken first withstands a larger current in a normal operation state. After the fusant to be broken first has been broken by impacting, the fusant to be broken later can be rapidly broken under dual function of thermal fusing effect of current increase and pulling force. Moreover, the fusant to be broken later has a smaller cross-sectional dimension, and is in more sufficient contact with the arc extinguishing filler, then the arc extinguishing effect in the breaking is better.

With such configuration, the power consumption can be reduced, and the large current breaking capacity can be improved.

Optionally, the housing may include a first sub-housing and a second sub-housing, and the first sub-housing and the second sub-housing are spliced to form the housing. The first sub-housing and the second sub-housing may be assembled together in a detachable connection manner, for example, the first sub-housing and the second sub-housing may be assembled and fixed through a bolt.

The closed chamber may be independently provided in the first sub-housing and the second sub-housing. Alternatively, the closed chamber may include a first portion and a second portion which are located in the first sub-housing and the second sub-housing, respectively, and the first sub-housing and the second sub-housing are butt-jointed to form a complete closed chamber. With such configuration, the arc extinguishing filler can be conveniently filled in the closed chamber, and after the fusant is broken, the fusant can be replaced so that the fuse can be used repeatedly.

Optionally, an opening may be provided on the closed chamber, a sealing plug may be provided in the opening, and the fusant passes through the sealing plug into the closed chamber or out of the closed chamber. By providing the sealing plug as a passage through which the fusant passes, breaking the fusant by a force is not affected, and the sealing performance can also be ensured, so that the arc extinguishing filler will not flow out when the fusant is pulled.

Optionally, the impact apparatus includes: a drive member and an impact member, wherein the drive member is configured to drive the impact member to act when receiving an excitation signal, the excitation signal being an excitation signal sent when a fault current is detected or an excitation signal sent in response to a user operation; and the impact member is configured to generate a pulling force on the fusant when acting so as to make the fusant broken under effect of a pulling force. In this implementation mode, the drive member can act in response to the generation of a fault current or a user operation, and drive the impact member to move and impact the fusant, so that the fusant can be broken under the excitation signal.

In the above, the excitation signal may be an electrical excitation signal, or a magnetic excitation signal or other excitation signals. The excitation signal may be sent when the controller detects a fault current, and also may be sent after the controller receives the user operation.

The drive member may be various drive members in pneumatic, hydraulic, or electric forms such as an air cylinder, a hydraulic cylinder, or a motor, which is not limited herein, as long as the drive member can drive the impact member to generate an impact force.

The impact member may be a movement mechanical member such as a piston, an impact block, or a slide block, or a fluid (e.g., gas or liquid) module (i.e., a gas/liquid bladder enclosing a gas or a liquid). It could be understood that when the impact member is a fluid module, a fluid chamber with good sealing performance should be disposed in the housing, so that the fluid module is deformed by force to transfer a moment.

Optionally, the housing may be provided therein with a limiting member, configured to maintain the impact member in a preset position in a normal operation state.

For example, the housing may be provided therein with a cavity, and the impact apparatus is provided in the cavity. A limiting groove can be provided on a side wall of the cavity, a limiting bump can be provided on the impact member, and the limiting bump is embedded in the limiting groove, so that the impact member is maintained in a preset position in a normal operation state. Moreover, the limiting bump can be broken when the impact member is impacted, and will not hinder the movement of the impact member.

Optionally, the housing can be provided therein with a guide member, configured to guide the impact member so that the impact member moves in a preset direction. By means of the guide member, the impact apparatus and a connection conductive terminal are made to maintain a preset movement direction, thereby improving the use stability and safety. For example, the guide member may be a guide rod, and the impact member is sleeved on the guide rod. Alternatively, the guide member may be a guide slide groove, and the impact member is provided in the guide slide groove, both of which can serve a guiding function.

In an embodiment, the number of closed chambers may be one or more. For example, when the number of closed chambers is one, the fusant is connected between the first conductive terminal and the second conductive terminal, and is partially located in the closed chamber, and partially located outside the closed chamber, and the impact apparatus can be opposite to the part of the fusant located outside the closed chamber, generating a pressure on the fusant, and further making the fusant broken at the weak portion located in the closed chamber.

Optionally, the number of closed chambers is two, and the fusant includes a first fusant and a second fusant provided in the two closed chambers in a penetrating manner, respectively; and the impact apparatus is located between the two closed chambers. With such configuration, the impact apparatus generates an impact force between the two closed chambers, so that the first fusant and the second fusant are broken in the two closed chambers, respectively, the force is more uniform, the breaking process of the fusants is more stable, with higher controllability.

Optionally, the first conductive terminal and the second conductive terminal are respectively inserted into the housing from two sides of the housing, the fuse further includes the connection conductive terminal provided in the housing, the first fusant is connected between the first conductive terminal and the connection conductive terminal, and the second fusant is connected between the second conductive terminal and the connection conductive terminal; and the impact apparatus is opposite to the connection conductive terminal, and is configured to impact the connection conductive terminal to move so as to make the fusant broken. By impacting the connection conductive terminal, the connection conductive terminal drives the fusant to be broken, then the structure is relatively stable, the stress distribution during impact is uniform, with relatively high safety and stability.

Optionally, the second conductive terminal includes a to-be-broken portion, and the to-be-broken portion is spaced apart from and opposite to the first conductive terminal; the first fusant and the second fusant each have one end connected to the first conductive terminal, and the other end connected to the to-be-broken portion; and the impact apparatus is opposite to the to-be-broken portion, and is configured to impact the to-be-broken portion to move so as to make the fusant broken. In this way, it is unnecessary to introduce an additional conductive terminal into the circuit, thus simplifying the circuit structure. Moreover, the first fusant and the second fusant are arranged in parallel, and can be broken in a delayed manner, further reducing the power consumption and improving the large current breaking capacity.

Hereinafter, the fuse having the above structure is described specifically.

As shown in FIG. 1, FIG. 2, and FIG. 3, the housing is formed by hermetically combining a first sub-housing 1 and a second sub-housing 2 which are provided on the left and right. A partial accommodating cavity for accommodating the first conductive terminal 3 and the second conductive terminal 4 is provided in an upper portion of the first sub-housing 1 and the second sub-housing 2, respectively. When the first sub-housing 1 and the second sub-housing 2 are assembled, the first conductive terminal 3 and the second conductive terminal 4 are inserted into the accommodating cavity, and are respectively located at two sides of the housing and are spaced apart from and opposite to each other. The assembled housing may be fixed by a screw.

A first cavity 12 is provided in the housing between the first conductive terminal 3 and the second conductive terminal 4, and a second cavity 13 in communication with the first cavity 12 is provided in the housing below the first cavity 12. The first cavity 12 and the second cavity can be divided into two parts, and are separately provided in the first sub-housing 1 and the second sub-housing 2. When the first sub-housing 1 and the second sub-housing 2 are combined to form the housing, the separated partial cavities are also accordingly combined to form a complete first cavity 12 and a complete second cavity. Optionally, the first cavity 12 and the second cavity may also be separately provided on the first sub-housing 1 or the second sub-housing 2.

A drive member 5 and a piston 6 (equivalent to an impact member) are sequentially provided from top to bottom in the first cavity 12 between the first conductive terminal 3 and the second conductive terminal 4. An inner diameter of a part where the piston 6 is located is greater than an inner diameter of a part where the drive member 5 is located, and a transverse partition is provided in the first cavity 12 at a position between the piston 6 and the drive member 5. A limiting groove 14 is provided on an inner wall of the first cavity 12 at a position opposite to the piston 6, a limiting bump 15 is provided on the piston 6, and the limiting bump 15 on the piston 6 is clamped in the limiting groove 14 to limit an initial position of the piston 6. The drive member 5 is a miniature pneumatic device, and it can receive an excitation signal from the outside, and release a high-pressure gas, thereby driving the piston 6 to move downwards against the limiting effect.

Closed chambers are respectively provided at two sides of the cavity mounted with the drive member 5 and the piston 6 right below the first conductive terminal 3 and the second conductive terminal 4. Each closed chamber may include two parts respectively located in the first sub-housing 1 and the second sub-housing 2, and the first sub-housing 1 and the second sub-housing 2 are butt-jointed to form a complete closed chamber. Certainly, one complete closed chamber can be provided in the first sub-housing 1, and another complete closed chamber can be provided in the second sub-housing 2, so that the assembled housing includes two opposite closed chambers.

The connection conductive terminal 7 may be provided in the second cavity, and abut against a bottom surface of the closed chamber. The piston 6 is located right above the connection conductive terminal 7. A guide post 8 is provided in the second cavity, and the guide post 8 has a lower end fixed to a bottom of the housing, and an upper end fixed on a transverse partition in the first cavity 12 between the piston 6 and the drive member 5. The piston 6 and the connection conductive terminal 7 are respectively sleeved on the guide post 8, and can perform an up-and-down displacement motion along the guide post 8 under the action of an external force. The guide post 8, as a guide member, guides the connection conductive terminal 7 and the piston 6 to move smoothly downward along a predetermined path. The guide member may also be a longitudinal guide groove provided in the second cavity, and the connection conductive terminal 7 and the piston 6 are respectively slidably provided in the guide groove.

A first fusant 9*a* and a second fusant 9*b* are provided in a penetrating manner in the closed chambers below the first conductive terminal 3 and the second conductive terminal 4, respectively, the first fusant 9*a* located below the first conductive terminal 3 has an upper end connected to the first conductive terminal 3, and a lower end connected to the connection conductive terminal 7; and the second fusant 9*b* located below the second conductive terminal 4 has an upper end connected to the second conductive terminal 4, and a lower end connected to the connection conductive terminal 7. The first conductive terminal 3, the first fusant 9*a*, the connection conductive terminal 7, the second fusant 9*b*, and the second conductive terminal 4 are connected in series to form a conductive structure of the whole fuse. The arc extinguishing filler 10 is filled in each closed chamber. The first fusant 9*a* and the second fusant 9*b* may be provided with a weak portion 11 thereon, and the weak portion 11 is located in the closed chamber, ensuring that arcs generated after the first fusant 9*a* and the second fusant 9*b* are broken are extinguished in the arc extinguishing filler 10.

When the piston 6 impacts the connection conductive terminal 7 and drives the connection conductive terminal 7 to move downwards, it can be ensured that the first fusant 9*a* and the second fusant 9*b* are broken immediately, thereby disconnecting the circuit, and protecting the circuit. When the piston 6, driven by the drive member 5, impacts downwards the connection conductive terminal 7, the connection conductive terminal 7 can be displaced downwards along the guide post 8 to the bottom of the second cavity. The space of the second cavity should at least satisfy that the fusant 9 can be broken when the connection conductive terminal 7 is moved.

When the fuse is used on a vehicle, the vehicle is in a normal operation state, a vehicle control system does not send an excitation signal, and the drive member 5 is in a standby state. At this time, a current flows in from the first conductive terminal 3, passes through the first fusant 9*a*, the connection conductive terminal 7, and the second fusant 9*b* in sequence, and flows out from the second conductive terminal 4.

When the vehicle is in an abnormal state or a fault current occurs, the vehicle control system sends an excitation signal to the drive member 5, the drive member 5 operates and pushes the piston 6, the piston 6 drives the connection conductive terminal 7 to move downwards, and the connection conductive terminal 7, in the process of moving downwards, pulls the first fusant 9*a* and the second fusant 9*b*, causing the first fusant 9*a* and the second fusant 9*b* to be broken at the weak portion 11, and the arcs generated at the fracture is quickly extinguished with the aid of the surrounding arc extinguishing filler 10. At this time, the connection conductive terminal 7 brings the fractured fusant 9 to continue to move downwards along the guide post 8, and stops at the bottom of the second cavity. The circuit of the vehicle is cut off, completing the protection to the system circuit.

In this structural solution, the dimension of the product is relatively small. Taking a specific dimension as an example, the dimension of a main body portion (the dimension of the main body does not include the dimension of overlap-joint copper busbar portions at two sides, similarly below) is 54 mm (length)*50 mm (width)*72 mm (height), and a rated voltage of 1000 VDC and a rated current of 400 A are designed. As the partial resistance of the first fusant 9*a* and the second fusant 9*b* is less than 0.03 mΩ, and the overall resistance of the product is less than 0.1 mΩ, under a current of 400 A, the heat loss power thereof is less than 16 W. The total weight of the product is less than 550 g. The current range that can be protected is 0-10000 A, and the action time is 2 ms. The action time is fixed, irrelevant to the magnitude of the fault current. The impact resistance at 1500 A/5 ms can be up to 100000 times or more.

Optionally, as shown in FIG. 4, FIG. 5, FIG. 6, and FIG. 7, in this embodiment, the fuse housing is formed by combining a first sub-housing 21 and a second sub-housing 22 which are provided in a vertical direction, a first conductive terminal 27 is inserted into the first sub-housing 21 located in an upper portion, and a second conductive terminal 23 is inserted into the second sub-housing 22 located in a lower part. The first conductive terminal 27 and the second conductive terminal 23 include parts spaced apart and facing each other, and the to-be-broken portion 232 is provided on a part of the second conductive terminal 23 opposite to the first conductive terminal 27. In the above, the to-be-broken portion 232 may be obtained by providing the weak portion 231 on the second conductive terminal 23, wherein the weak portion 231 may be a structure such as a through hole or a breaking groove that extends in a width direction of the second conductive terminal 23 and is located at two ends of the to-be-broken portion 232. The breaking groove can be in a V shape, U shape or other shapes. Alternatively, the overall thickness of the to-be-broken portion 232 may be less than the thickness of the rest parts, which also can make the to-be-broken portion 232 separated from the second conductive terminal 23 when being impacted.

A through cavity is provided on the first sub-housing 21, and a drive member 24 and a piston 25 (equivalent to the impact member) are sequentially provided in the cavity from top to bottom. The drive member 24 is fixed in the cavity through a limiting step and a pressing plate 26, a cavity portion of the first sub-housing 21 for accommodating the drive member 24 protrudes towards an upper part of the first sub-housing 21, and the first conductive terminal 27 is provided in a protruding portion of the first sub-housing 21 in a penetrating manner, and is fixed on the first sub-housing 21 through a screw. The piston 25 is fixed at an initial position in the cavity through the limiting groove 33 and the limiting bump 34, and the limiting groove 33 and the limiting bump 34 may be in the same structure as the limiting groove 14 and the limiting bump 15 in FIG. 1 to FIG. 3. The piston 25 is located right above the to-be-broken portion 232 of the second conductive terminal 23.

The two closed chambers can be provided in the first sub-housing 21, an opening can be provided on the closed chambers, a sealing plug 28 is filled in the opening, and the first fusant 30*a* and the second fusant 30*b* pass through the sealing plug 28 to be connected to the second conductive terminal 23. The sealing plug 28 can ensure effective sealing of the fusant 30 and the arc extinguishing filler 31, and also allow the broken portion of the fusant 30, after being broken, to slide outwards, and the arc extinguishing filler 31 does not significantly leak when the fusant 30 is pulled out.

The second conductive terminal 23 may contact a bottom surface of the first sub-housing 21. Optionally, an insulating plate 29 may be further provided between contact surfaces of the second conductive terminal 23 and the first sub-housing 21. The insulating plate 29 can prevent the sealing plug 28 from sliding outwards, can effectively assist the fusant 30 to dissipate heat, and can assist in generating gas and expand to squeeze the region, to assist in arc extinguishing, when the fusant 30 is broken and then slides outwards.

A cavity is provided in the second sub-housing 22 for the to-be-broken portion 232 to fall downwards with the broken arc-extinguished fusant 30 after being broken, so that the to-be-broken portion 232 can move downwards to break the fusant 30.

The first fusant 30*a* passes through the insulating plate 29, one closed chamber, and the sealing plug 28, and has an upper end connected to a part of the first conductive terminal 27, and a lower end connected to a part of the to-be-broken portion 232 on the second conductive terminal 23. The second fusant 30*b* passes through the insulating plate 29, the other closed chamber, and the sealing plug 28 thereon, and has an upper end connected to another part of the first conductive terminal 27, and a lower end connected to another part of the to-be-broken portion 232 on the second conductive terminal 23. The first fusant 30*a* and the second fusant 30*b* are connected in parallel between the first conductive terminal 27 and the second conductive terminal 23.

The first fusant 30*a* may include a fusant to be broken first and a fusant to be broken later that are connected in parallel, and the second fusant 30*b* may include a fusant to be broken first and a fusant to be broken later that are connected in parallel. With such design, the power consumption can be reduced, and the large current breaking capacity can be improved. Reference can be made to the above for the specific configuration method.

For example, for either of the first fusant 30*a* and the second fusant 30*b*, the cross-section of the fusant can be made smaller, or more or larger fractures or narrow paths can be provided on the fusant, so that the fusant is broken first when being subjected to a force.

A work flow of the above fuse is as follows.

When the vehicle is in the normal operation state, the vehicle control system does not send the excitation signal, therefore the drive member 24 is in the standby state; at this time, the current flows in from the first conductive terminal 27, passes through the first fusant 30*a* and the second fusant 30*b* connected in parallel, and then flows out from the second conductive terminal 23.

When the vehicle is in the abnormal state or the fault current occurs, the vehicle control system sends the excitation signal to the drive member 24, the drive member 24 operates and pushes the piston 25 to move downwards, the piston 25 impacts the to-be-broken portion 232 on the second conductive terminal 23, and the to-be-broken portion 232 is broken at the weak portion 231; the to-be-broken portion 232 continues to move downwards under the push of the piston 25, and pulls the first fusant 30*a* and the second fusant 30*b* to be broken at the weak portion 231 during the movement. The arcs generated at the fractures of the first fusant 30*a* and the second fusant 30*b* are quickly extinguished with the aid of the surrounding arc extinguishing filler 31. At this time, the to-be-broken portion 232 continues to move downwards with the broken fusant 30, and is finally buffered and stopped at a predetermined position with the help of the second sub-housing 22. The circuit of the vehicle is cut off, completing the protection to the system circuit.

With this structural scheme, the product has a relatively small dimension, and taking the main body portion having a dimension of 54 mm (length)*50 mm (width)*72 mm (height) as an example, a rated voltage of 1000 VDC and a rated current of 400 A are designed. As the partial resistance of the fusant 30 is less than 0.03 mΩ, and the parallel connection manner is adopted, the overall resistance of the product is predicted to be less than 0.05 mΩ, and under a current of 400 A, the heat loss power thereof is 8 W. The overall weight of the product is less than 550 g. The current range that can be protected is 0-10000 A, and the action time is 2 ms. The action time is fixed, irrelevant to the magnitude of the fault current. The impact resistance at 1500 A/5 ms can be up to 100000 times or more.

As for the thermal fuse, in order to realize the rated current of 400 A at 1000 VDC, the conventional thermal fuse has a main body dimension of 80 mm (length)*60 mm (width)*60 mm (height), a resistance of about 0.180 mΩ, and an operating power of 28.8 W under long-term current of 400 A. The fuse has a weight over 700 g. The current range that can be protected is 2500-10000 A, the action time is 1000-2 ms. The action time decreases with the current increase, and the action cannot be ensured below 2500 A. The impact resistance at 1500 A/5 ms is 500-1000 times.

As for the common excitation fuse, the product resistance is 0.040 mΩ, and the operating power is 6.4 W under long-term current of 400 A. The product has a weight of 500 g, the main body dimension of the whole product is 70*70*110 mm, and the dimension is relatively larger. The current range that can be protected is 0-10000 A, and action time is 2 ms. The action time is fixed, irrelevant to the magnitude of the fault current. The impact resistance at 1500 A/5 ms is more than 100000 times. Without auxiliary means, the volume of the product will be increased significantly as the voltage increases.

As for the excitation fuse integrated with a fusant to be broken by a mechanical force, the product resistance is 0.040 mΩ, and the operating power is 6.4 W under long-term current of 400 A. The product has a weight less than 550 g, and the main body dimension of the whole product is 54*50*72 mm. The current range that can be protected is 1000 A-20000 A, and the action time is 2 ms. The action time is fixed, irrelevant to the magnitude of the fault current. The impact resistance at 1500 A/5 ms is 100000 times or more. This solution can hardly provide protection to the system at 0~1000 A.

It can be seen from the above that the fuse solution of the present disclosure can effectively improve various performances of the excitation fuse. Meanwhile, the costs are not significantly increased. The present disclosure has the following advantages: the product has a small resistance, low heat generation, and low power consumption; can support zero-current cut-off, and can quickly and reliably disconnect large and small fault currents; the product has a higher anti-current-impact capability; the product is less affected by air pressure, temperature and humidity, and can be reliably disconnected in various operating conditions; a production process of a fuse can be directly used for the product, and the product is mature and has high reliability; the breaking capacity of the product can be adjusted according to requirements; the breaking capacity of the product after long-term use is not obviously aged; and the breaking is completely controlled, and the system can adjust the breaking by itself according to actual operating conditions.

Figure 8:
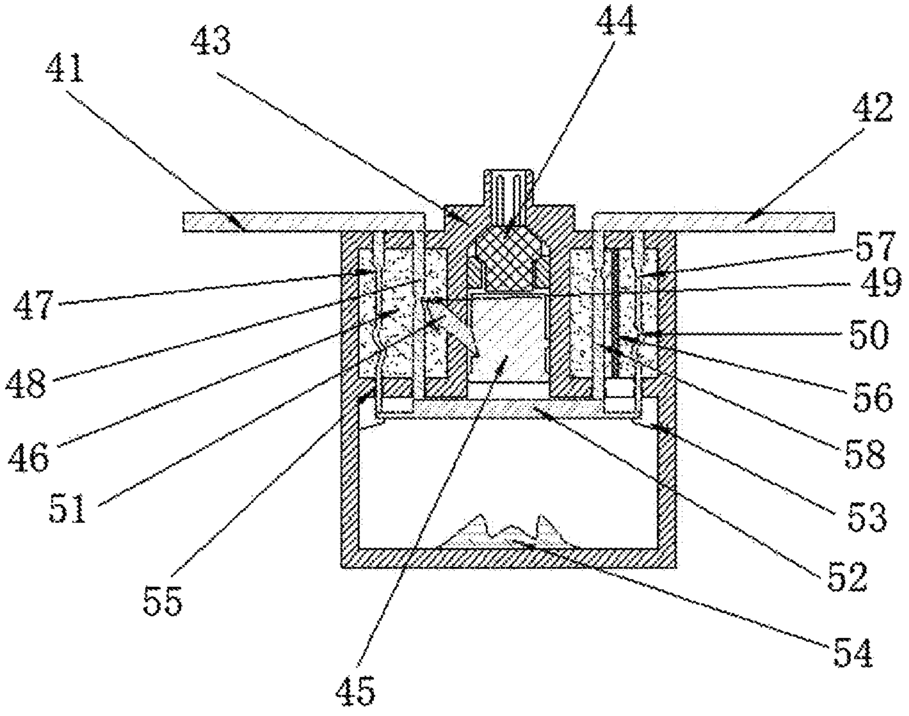
FIG. 8 is a front sectional view of an optional fuse provided in an embodiment of the present disclosure.

As shown in FIG. 8, the first conductive terminal 41 and the second conductive terminal 42 are provided on left and right sides of the upper portion of the housing 43 spaced apart from and opposite to each other. The upper portion of the housing 43 is provided with two closed chambers 46 spaced apart from and opposite to each other, and the two closed chambers 46 are respectively located in lower parts of the first conductive terminal 41 and the second conductive terminal 42. The closed chamber 46 on the left is provided with a first fusant 48 to be broken first and a first fusant 47 to be broken later in a penetrating manner, and the closed chamber 46 on the right is provided with a second fusant 58 to be broken first and a second fusant 57 to be broken later in a penetrating manner.

A connection conductive terminal 52 is provided in a cavity in a lower part of the housing 43, the first fusant 48 to be broken first and the first fusant 47 to be broken later each have an upper end connected to the first conductive terminal 41, and a lower end connected to a left end of the connection conductive terminal 52. The second fusant 58 to be broken first and the second fusant 57 to be broken later each have an upper end connected to the second conductive terminal 42, and a lower end connected to a right end of the connection conductive terminal 52. The first conductive terminal 41, the first fusants 47, 48, the connection conductive terminal 52, the second fusants 57, 58, and the second conductive terminal 42 are sequentially connected in series. The first fusants 47, 48 include two fusants connected in parallel and successively broken. The second fusants 57, 58 include two fusants connected in parallel and successively broken.

The impact apparatus includes a drive member 44 and a piston 45 (in this embodiment, the piston 45 is used as an impact member), and the piston 45 is opposite to the connection conductive terminal 52. Moreover, a side wall of the piston 45 cooperates with the fusant punch 51, and when moving downwards, the piston 45 can drive the fusant punch 51 to move towards the interior of the closed chamber 46, to break the fusant by impacting. In the above, the fusant punch 51 is opposite to the weak portion 49 of the fusant to be broken first.

When receiving the excitation signal to act, the drive member 44 drives the piston 45 to move downwards. Meanwhile, the fusant punch 51 breaks the first fusant 48 to be broken first by impacting. Then the piston 45 continues to move downwards, and as a zigzag portion 50 is provided on the first fusant 47 to be broken later and the second fusant 57 to be broken later, the piston 45 pushes the connection conductive terminal 52 to continue to move downwards for a certain distance so that the fuse is completely broken when the first fusant 47 to be broken later and the second fusant 57 to be broken later are broken.

Contact surface of the side wall of the piston 45 and the fusant punch 51 may be beveled surface, such that the piston, when moving downwards, drives the fusant punch 51 to transversely move to break the first fusant 48 to be broken first by impacting.

In this process, the first fusant 48 is first broken by impacting by the fusant punch 51 in the closed chamber 46, no spark will be generated in the arc extinguishing filler environment of the closed chamber 46, and at this time, the circuit still remains in an on state. Thereafter, the first fusant 47 to be broken later and the second fusant 57 to be broken later can be broken under the action of a pulling force, or can be thermally fused due to current increase. No spark will be generated at the breaking position in the arc extinguishing filler environment in the closed chamber 46.

In this embodiment, a cross-sectional dimension of the fusant to be broken first can be larger than that of the fusant to be broken later, so that the fusant to be broken first withstands a larger current in a normal operation state. After the fusant to be broken first is broken by impacting, the fusant to be broken later can be rapidly broken under dual function of thermal fusing effect of current increase and pulling force. Moreover, the fusant to be broken later has a smaller cross-sectional dimension, and is in more sufficient contact with the arc extinguishing filler, then the arc extinguishing effect in the breaking is better. With such configuration, the power consumption can be reduced, and the large current breaking capacity can be improved.

As shown in FIG. 8, a separating plate 56 can be provided in the closed chamber 46, and the separating plate 56 is located between the fusant to be broken first and the fusant to be broken later, and separates the two from each other, so that the fusant to be broken first, when being broken, does not affect the fusant to be broken later.

As shown in FIG. 8, a buffer member 54 may be provided at a position of the bottom of the housing 43 opposite to the connection conductive terminal 52, so that the impact force of the connection conductive terminal 52 when falling to the bottom is smaller.

As shown in FIG. 8, a support member 53 may be provided at a position of an inner side wall of the housing 43 opposite to the connection conductive terminal 52, and is configured to support the connection conductive terminal 52, so that it is maintained at a preset position in the housing 43 in a normal operation state, thereby avoiding the generation of a pulling force on the fusant, and not affecting the normal operation state of the fusant.

Similar to the above embodiment, a sealing plug 55 is provided at a position where the fusant passes through the closed chamber 46, which will not be repeated herein.

Besides, an embodiment provides a circuit system, including any one of the above fuses. The circuit system, as including any one of the above fuses, also has the technical effects described in the above, and details are not repeated herein.

The above-mentioned are merely for the embodiments of the present disclosure and not used to limit the scope of protection of the present disclosure. For one skilled in the art, various modifications and changes may be made to the present disclosure. Any modifications, equivalent substitutions, improvements and so on, made within the spirit and principle of the present disclosure, should be covered within the scope of protection of the present disclosure. It should be noted that similar reference signs and letters represent similar items in the following accompanying drawings, therefore, once a certain item is defined in one accompanying drawing, it is not needed to be defined or explained in subsequent accompanying drawings.

The above are merely specific contents of the present disclosure, but the scope of protection of the present disclosure is not limited thereto, and changes or substitutions that may be easily envisaged by any person skilled in the present art within the technical scope disclosed in the present disclosure should be covered within the scope of protection of the present disclosure. Therefore, the scope of protection of the present disclosure should be determined by the scope of protection of the claims.

It should be indicated that in the present text, relational terms such as first and second are merely for distinguishing one entity or operation from another entity or operation, while it is not necessarily required or implied that these entities or operations have any such practical relation or order. Moreover, terms "including", "containing" or any other variations thereof are intended to be non-exclusive, thus a process, method, article or device including a series of elements not only include those elements, but also include other elements that are not listed definitely, or further include elements inherent to such process, method, article or device. Without more restrictions, an element defined with the wording "including a . . . " does not exclude existence of other same elements in the process, method, article or device including the element.

INDUSTRIAL APPLICABILITY

The fuse and the circuit system in the present disclosure can reduce the magnitudes of current and acting force acting on each fusant, so that the state of the fuse in the normal operation state is stable, the fusants, when being in the normal operation, can withstand a larger current as a whole, and when being broken, are broken in sequence, then it is easier to disconnect a large current, the power consumption can be reduced, the large current breaking capacity is improved, moreover, an additional conductive terminal does not need to be introduced into the circuit, simplifying the circuit structure, delaying the disconnection, further reducing the power consumption, and improving the large current breaking capacity.

What is claimed is:

1. A fuse, comprising:

a housing, a closed chamber being provided in the housing, the closed chamber being filled with an arc extinguishing filler, and a first conductive terminal and a second conductive terminal which are respectively used as a current input end and a current output end being connected to the housing;

a fusant, connected in series between the first conductive terminal and the second conductive terminal, and at least partially provided in the closed chamber in a penetrating manner; and an impact apparatus, provided in the housing and located outside the closed chamber, and configured to act, when receiving an excitation signal, on the fusant to generate an impact force so as to make the fusant broken in the closed chamber;

wherein a plurality of closed chambers are provided, a corresponding fusant is provided in each of the closed chambers in a penetrating manner, and a plurality of fusants provided in the plurality of closed chambers in a penetrating manner are connected in series or in parallel.

2. The fuse according to claim 1, wherein a plurality of fusants connected in parallel are provided in each of the closed chambers in a penetrating manner, and the plurality of fusants connected in parallel are provided as a fusant to be broken first and a fusant to be broken later.

3. The fuse according to claim 2, wherein the fuse further comprises a fusant punch, the fusant punch is provided on an outer wall of the closed chamber in a dynamic sealing manner, with one end being linked with the impact apparatus, and the other end being opposite to the fusant to be broken first, and is configured to move and break the fusant to be broken first by impacting when the impact apparatus acts.

4. The fuse according to claim 3, wherein the fusant to be broken later is provided with a zigzag segment, configured to be broken after extending to a predetermined length.

5. The fuse according to claim 4, wherein the zigzag segment is in an S-shaped wave structure or a spiral structure.

6. The fuse according to claim 1, wherein a weak portion is provided at a position where the fusant is located within the closed chamber, so that the fusant is broken at the weak portion when being impacted.

7. The fuse according to claim 6, wherein a structure of the weak portion is a through hole or a breaking groove.

8. The fuse according to claim 1, wherein the impact apparatus comprises a drive member and an impact member, the drive member is configured to drive the impact member to act when receiving an excitation signal, the excitation signal being an excitation signal sent when a fault current is detected or an excitation signal sent in response to a user operation; and the impact member is configured to generate a pulling force on the fusant when acting so as to make the fusant broken under effect of the pulling force.

9. The fuse according to claim 1, wherein two closed chambers are provided, the two closed chambers are provided spaced apart from and opposite to each other, and the fusant comprises a first fusant and a second fusant respectively provided in the two closed chambers in a penetrating manner; and the impact apparatus is located between the two closed chambers.

10. The fuse according to claim 9, wherein the first conductive terminal and the second conductive terminal are respectively inserted into the housing from two sides of the housing, the fuse further comprises a connection conductive terminal provided in the housing, wherein the first fusant is connected between the first conductive terminal and the connection conductive terminal, and the second fusant is connected between the second conductive terminal and the connection conductive terminal; and the impact apparatus is opposite to the connection conductive terminal, and is configured to impact the connection conductive terminal to move so as to make the fusant broken.

11. The fuse according to claim 9, wherein the fuse further comprises a guide member, configured to guide the impact apparatus and the connection conductive terminal.

12. The fuse according to claim 9, wherein the second conductive terminal comprises a to-be-broken portion, wherein the to-be-broken portion is spaced apart from and opposite to the first conductive terminal;

the first fusant and the second fusant each have one end connected to the first conductive terminal, and the other end connected to the to-be-broken portion; and the impact apparatus is opposite to the to-be-broken portion, and is configured to impact the to-be-broken portion to move so as to make the fusant broken.

13. The fuse according to claim 1, wherein the closed chamber is provided with an opening, a sealing plug is provided in the opening, and the fusant passes through the sealing plug to enter the closed chamber or exit the closed chamber.

14. The fuse according to claim 1, wherein the arc extinguishing filler is a solid arc extinguishing filler comprising silicon dioxide.

15. A circuit system, comprising the fuse according to claim 1.

16. The fuse according to claim 1, wherein a plurality of fusants connected in parallel are provided in each of the closed chambers in a penetrating manner, and the plurality of fusants connected in parallel are provided as a fusant to be broken first and a fusant to be broken later.

17. The fuse according to claim 1, wherein a weak portion is provided at a position where the fusant is located within the closed chamber, so that the fusant is broken at the weak portion when being impacted.

18. The fuse according to claim 1, wherein the impact apparatus comprises a drive member and an impact member, the drive member is configured to drive the impact member to act when receiving an excitation signal, the excitation signal being an excitation signal sent when a fault current is detected or an excitation signal sent in response to a user operation; and the impact member is configured to generate a pulling force on the fusant when acting so as to make the fusant broken under effect of the pulling force.

19. The fuse according to claim 1, wherein two closed chambers are provided, the two closed chambers are provided spaced apart from and opposite to each other, and the fusant comprises a first fusant and a second fusant respectively provided in the two closed chambers in a penetrating manner; and the impact apparatus is located between the two closed chambers.

* * * * *